(12) United States Patent
Uematsu et al.

(10) Patent No.: US 6,295,167 B1
(45) Date of Patent: Sep. 25, 2001

(54) OPTICAL MATERIAL AND OPTICAL DEVICE

(75) Inventors: Takashi Uematsu; Ryojiro Akashi; Akinori Komura, all of Minami Ashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/318,126

(22) Filed: May 25, 1999

(30) Foreign Application Priority Data

Jul. 6, 1998 (JP) .................................................. 10-190409

(51) Int. Cl.⁷ .............................. G02B 1/06; G02B 26/02
(52) U.S. Cl. ............................................. 359/665; 359/228
(58) Field of Search ......................... 359/665, 666, 359/290–291, 296, 228; 345/84, 105–107

(56) References Cited

U.S. PATENT DOCUMENTS 4,832,466 * 5/1989 Nishimura et al. .................. 359/289
5,007,714 * 4/1991 Nishimura et al. .................. 359/296
5,739,946 * 4/1998 Iwanaga et al. ..................... 359/296

FOREIGN PATENT DOCUMENTS

| A-61-149926 | 7/1986 | (JP) . |
| A-61-151625 | 7/1986 | (JP) . |
| 62-925 | 1/1987 | (JP) . |
| A-62-927 | 1/1987 | (JP) . |
| 4-134325 | 5/1992 | (JP) . |
| A-4-274480 | 9/1992 | (JP) . |
| 5-188354 | 7/1993 | (JP) . |
| B2-7-95172 | 10/1995 | (JP) . |
| A-9-160081 | 6/1997 | (JP) . |

* cited by examiner

Primary Examiner—Jordan M. Schwartz
(74) Attorney, Agent, or Firm—Oliff & Berridge, PLC

(57) ABSTRACT

An optical material has a polymer gel whose volume is reversibly changed by absorbing or releasing a liquid in response to an external stimulus and a light scattering member covering at least a part of the surface of the polymer gel.

31 Claims, 3 Drawing Sheets

OPTICAL MATERIAL AND OPTICAL DEVICE

FIELD OF THE INVENTION

The present invention relates an optical material, the light transmittance, the light scattering property and the light absorbance of which can be reversibly controlled by an external stimulus, and an optical device using the same.

BACKGROUND OF THE INVENTION

An optical material has been known, which control the amount of light transmission and a light scattering property by using a polymer gel, whose volume is reversibly changed (swelling and contraction) in response to the change in pH, the change in ion concentration, the adsorption, desorption of a chemical substance, heat, light, electric stimulus, or the like.

For example, JP-A-61-151621, JP-A-62-925 and JP-A-4-134325 disclose a device utilizing a polymer gel whose volume is changed by absorbing or releasing a liquid caused by a temperature change or an electric stimulus, the device displaying or erasing an image by changing the refractive index of the polymer gel by changing its density. JP-A-5-188354 discloses an optical device utilizing polymer gel particles whose volume is changed by absorbing or releasing a liquid caused by a stimulus of an electric field, the optical device becoming white turbid or transparent by making the diameter of the polymer gel particles larger or smaller than the wavelength of light to change the refractive index.

However, in these optical devices disclosed in these publications, because the usable materials of the polymer gels are restricted, the difference in refractive index between the polymer gel and the liquid cannot be made large, and, as a result, a contrast between the background (white turbid part) and the image (transparent part), i.e., the display contrast, is low.

JP-A-61-149926 and JP-A-7-95172 disclose an optical device constituted by a composition comprising a composition containing a polymer gel whose volume is changed by absorbing or releasing a liquid caused by a stimulus of an electric field, and a liquid colored with a coloring matter. In this optical device, the colored liquid moves by the change in shape of the polymer gel, to display or erase an image by the change in light absorption.

However, in these optical devices disclosed in these publications, the colored liquid is mixed in the polymer gel by the repetition of swelling and contraction of the polymer gel, to thereby contaminate the polymer gel, and, as a result, there is a possibility that the display contrast is lowered.

JP-A-61-151625 and JP-A-62-927 disclose a device using a colored polymer gel which swells or contracts by heat. This device utilizes such a mechanism that when the polymer gel swells, i.e., the volume of the polymer gel is increased, the concentration of the coloring matter is decreased to lower the optical density, and when the polymer gel contracts, the concentration of the coloring matter is increased to increase the optical density.

However, in the optical device disclosed in the above publication, because the polymer gel is colored when the volume thereof is small, a sufficient display contrast cannot be obtained.

JP-A-4-274480 discloses an optical device utilizing a polymer gel, to which a dye is connected by a covalent bond, swelling or contracting by an electric field. The optical device utilizes such a mechanism that when the polymer gel swells, i.e., the volume of the polymer gel is increased, the optical density is increased by increasing the area of the polymer gel capable of absorbing light, and when the polymer gel contracts, i.e., the volume of the polymer gel is decreased, the optical density is lowered by decreasing that area.

However, in the optical device proposed in the above publication, a sufficient display contrast cannot be obtained because the concentration of the dye contained in the polymer gel is low.

JP-A-9-160081 discloses an optical device utilizing colored fine particles and a polymer gel adsorbed on the colored fine particles. In this optical device, the polymer gel swells or contracts by the action of an electric field, and the optical density is changed by the change in the ratio of that surface of the colored fine particles which is covered with the polymer gel.

However, in the optical device disclosed in the above publication, when the used amount of the polymer gel is increased with respect to the amount of the colored fine particles, the optical density is not sufficiently increased when the polymer gel contracts, and the display contrast is lowered. When the used amount of the polymer gel is decreased, on the other hand, the optical density is not sufficiently increased when the polymer gel swells, and the display contrast is lowered.

The inventors have proposed a novel optical material in Japanese Patent Application No. 9-345541. The optical material disclosed in the above application comprises a polymer gel which swells or contracts by absorbing or releasing a liquid by providing a stimulus and contains a pigment in a concentration larger than the saturated absorbing concentration. In the optical material, when the polymer gel contracts, the pigment locally agglomerates to lower the light absorption efficiency and the optical density, so as to cause discoloration. When the polymer gel swells, on the other hand, the light absorption efficiency is increased by dispersing the pigment throughout the optical material, and the optical density is increased to cause color generation.

However, in the optical material disclosed in the above application, because the agglomerated pigment contained in the polymer gel in a high concentration absorbs light even when the polymer gel contracts, the optical material cannot be completely discolored.

SUMMARY OF THE INVENTION

The invention has been developed in view of the problems associated with the conventional techniques, and an object of the invention is to provide a novel optical material and a novel optical device that have a high display contrast.

The above and other objects can be attained by the invention described below.

The invention provides an optical material comprising a polymer gel, whose volume is reversibly changed by absorbing or releasing a liquid in response to an external stimulus, and a light scattering member covering at least part of the surface of the polymer gel.

The invention also provides an optical device comprising an optical material, a liquid released from or absorbed by the optical material, and a cell in which a pair of substrates, between which the optical material and the liquid are maintained.

As the light scattering member in the optical material and the optical device, a light scattering material having a refractive index different from a refractive index of the liquid, or a polymer material containing the light scattering material dispersed therein. A second polymer gel that contracts in a condition where the polymer gel swells, and swells in a condition where the polymer gel contracts, containing the light scattering material dispersed therein may also be used. The light scattering member preferably is in a form of particles having an average particle diameter of from 0.01 µm to 5 mm when the polymer gel contracts. In the case where the light scattering member contains the polymer material, the light scattering member preferably is in the form of particle having an average particle diameter of from 0.01 µm to 1 mm. The light scattering material preferably is in the form of particle having an average particle diameter of from 0.001 µm to 10 µm. The light scattering material may contain a coloring matter. In this case, it is preferred that the concentration of the coloring matter when the polymer gel contracts is the saturated absorption concentration or higher. It is also preferred that the light absorption efficiency of the coloring matter when the polymer gel swells is higher than that when the polymer gel contracts. Furthermore, the coloring matter is contained in the polymer gel in such a manner that when the coloring matter is agglomerated or concentrated on contraction of the polymer gel, a concentration of the coloring matter higher than the saturated absorption concentration is locally obtained at a part where the coloring matter is agglomerated or concentrated. According to this constitution, even when the total concentration of the coloring matter is lower than the saturated absorption concentration, a sufficient display contrast can be obtained. Examples of the external stimulus include change in pH, change in ion concentration, adsorption and desorption of a chemical substance, change in solution composition, heat, light and an application of energy by electricity and a magnetic field.

In the optical device of the invention, the cell may have a stimulus-providing means for providing an external stimulus.

FIGS. 1A and 1B are schematic diagrams showing the state where a polymer gel 12 of a optical material 10 of the invention contracts and swells, respectively.

Light scattering members 14 are fixed at a particular position of the surface of the polymer gel 12, and in the case where the polymer gel 12 contracts, the distance between the light scattering members 14 is narrower than that when the polymer gel swells, and an exposed part of the surface of the polymer gel 12 is smaller than that when the polymer gel 12 swells. Thus, a large proportion of light 16 incident on the optical material 10 is reflected (scattered) by the light scattering members 14 to decrease the quantity of the light 16 passing the polymer gel, and the optical material 10 becomes opaque.

When the polymer gel 12 swells, on the other hand, the distance between the light scattering members 14 is larger than that when the polymer gel 12 contracts, and an exposed part of the surface of the polymer gel 12 is larger than that when the polymer gel 12 contracts. Thus, a large quantity of light 16 passes through the polymer gel 12, and the optical material 10 becomes transparent.

Accordingly, in the optical material 10 of the invention, the quantity of light 16 incident onto the interior of the polymer gel 12 and the quantity of light 16 going out from the interior of the polymer gel 12 are controlled by swelling or contracting the polymer gel 12, so that the quantity of transmitted light and the scattering property can be considerably changed.

In the case where the optical material 10 contains a coloring matter 18, when the polymer gel 12 contracts as shown in FIG. 2A, a large proportion of light 16 incident on the optical material 10 is reflected by the light scattering member 14, so that not only a proportion of the coloring matter 18 not contributing to light absorption is increased, but also, since the coloring matter 18 agglomerates or is concentrated, the particles or molecules of the coloring matter 18 overlap each other to decrease the area capable of absorbing light throughout the total coloring matter, and thus the light absorptivity per one particle (or one molecule) of the coloring matter 18 is lowered to decrease the light absorption efficiency of the optical material 10. Thus, when the polymer gel 12 contracts, most of light 16 is not incident onto the interior of the polymer gel, and even when the light is incident onto the interior of the polymer gel, the optical material is discolored since the absorption area of the coloring matter 18 is small.

When the polymer gel 12 swells as shown in FIG. 2B, not only the quantity of light 16 incident onto the interior of the polymer gel 12 is large, but also, since the coloring matter 18 is diffused or diluted, the particles or molecules of the coloring matter 18 do not overlap each other to increase the area capable of absorbing light throughout the total coloring matter, and thus the light absorption efficiency of the optical material 10 is increased. Thus, when the polymer gel 12 swells, a large proportion of light 16 is incident onto the coloring matter 18 of a large absorption area, and the optical material 10 is colored.

As described in the foregoing, the optical material of the invention controls the quantity of light incident onto the interior of the polymer gel, the absorption surface area of the coloring matter and the light absorption efficiency by swelling or contracting the polymer gel, so as to considerably change the coloring density thereof.

Furthermore, in the optical material of the invention, the quantity of transmitted light, the light scattering property and the coloring density of the optical material itself are changed. Therefore, the optical material does not require any complicated constitution that is indispensable in a liquid crystal display, and the visibility does not depend on the viewing angle.

DETAILED DESCRIPTION OF THE INVENTION

Figure 1:
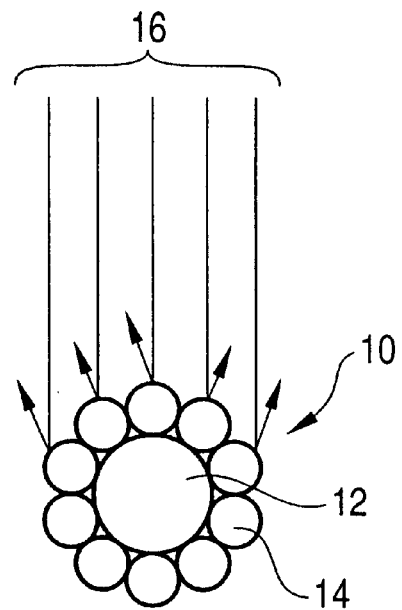
FIG. 1A is a schematic diagram showing the state in which the polymer gel of the optical material according to the invention contracts.
FIG. 1B is a schematic diagram showing the state in which the polymer gel of the optical material according to the invention swells.
Figure 1:
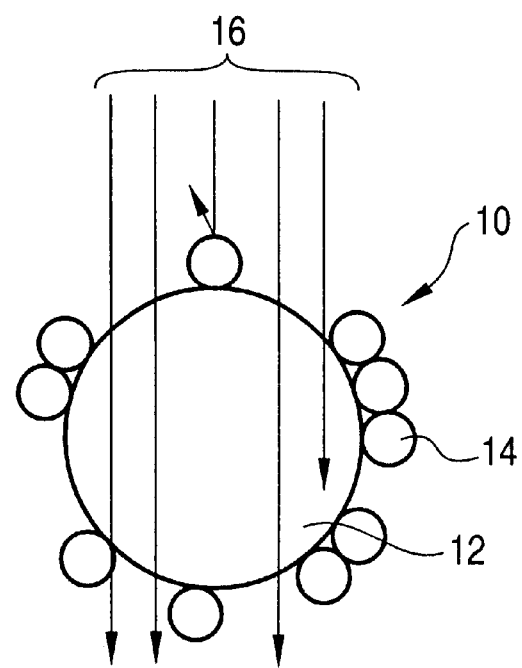
Figure 2:
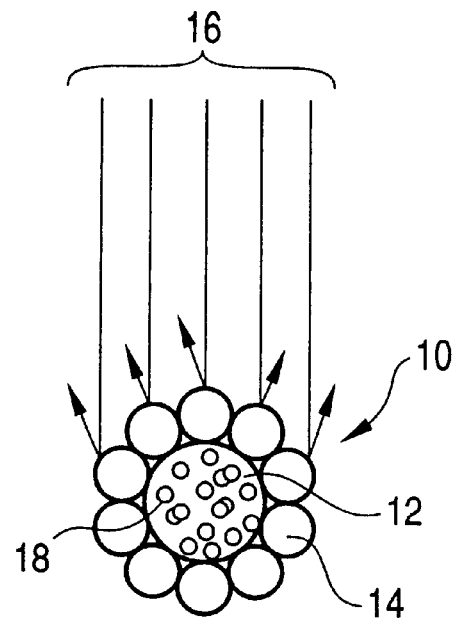
FIG. 2A is a schematic diagram showing the state in which the polymer gel of the optical material containing a coloring matter according to the invention contracts.
FIG. 2B is a schematic diagram showing the state in which the polymer gel of the optical material containing a coloring matter according to the invention swells.
Figure 2:
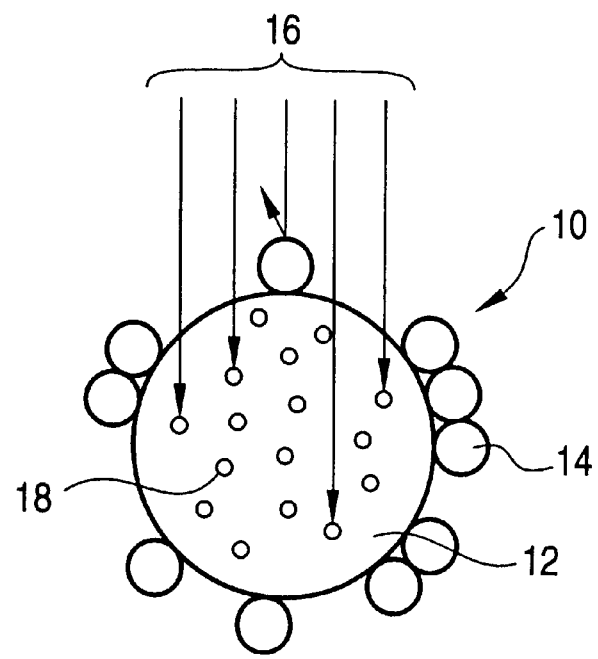

The optical material of the invention comprises a polymer gel whose volume is reversibly changed by absorbing or releasing a liquid caused by an external stimulus, and a light scattering member covering at least part of the surface of the polymer gel.

As the polymer gel which can be used in the optical material of the invention is used, a polymer gel whose volume is reversibly changed (i.e., swells or contracts) by absorbing or releasing a liquid caused by an external stimulus (i.e., responds to the external stimulus), such as change in pH, change in ion concentration, adsorption and desorption of a chemical substance, change in solution composition, heat, light and an application of energy by electricity and a magnetic field. In the following description, the material name including "(meth)" indicates both material whose name includes (meth) and material whose name does not include (meth).

As the polymer gel whose volume is changed by the change in pH, an electrolyte series polymer gel is preferred, and examples thereof include a crosslinked product of poly(meth)acrylic acid and a metallic salt thereof, a crosslinked product of a copolymer of (meth)acrylic acid with (meth)acrylamide, hydroxyethyl(meth)acrylate and/or an alkyl (meth)acrylate and a metallic salt thereof, a crosslinked product of polymaleic acid and a metallic salt thereof, a crosslinked product of a copolymer of maleic acid with (meth)acrylamide, hydroxyethyl(meth)acrylate and/or an alkyl (meth)acrylate and a metallic salt thereof, a crosslinked product of polyvinylsulfonic acid, a crosslinked product of a copolymer of vinylsulfonic acid with (meth) acrylamide, hydroxyethyl(meth)acrylate and/or an alkyl (meth)acrylate, a crosslinked product of polyvinylbenzenesulfonic acid and a metallic salt thereof, a crosslinked product of a copolymer of vinylbenzenesulfonic acid with (meth)acrylamide, hydroxyethyl(meth)acrylate and/or an alkyl (meth)acrylate and a metallic salt thereof, a crosslinked product of polyacrylamide alkylsulfonic acid and metallic salt thereof, a crosslinked product of a copolymer of acrylamide alkylsulfonic acid with (meth)acrylamide, hydroxyethyl(meth)acrylate and/or an alkyl (meth)acrylate and a metallic salt thereof, a crosslinked product of polydimethylaminopropyl(meth)acrylamide and a metallic salt thereof, a crosslinked product of a copolymer of dimethylaminopropyl(meth)acrylamide with (meth)acrylic acid, (meth)acrylamide, hydroxyethyl(meth)acrylate and/or an alkyl (meth)acrylate and a metallic salt thereof and a hydrochloride thereof, a crosslinked product of a complex of polydimethylaminopropyl(meth)acrylamide and polyvinyl alcohol and a hydrochloride thereof, a crosslinked product of a complex of polyvinyl alcohol and poly(meth)acrylic acid and a metallic salt thereof, a crosslinked product of a metallic salt of a carboxyalkylcellulose, and a partially hydrolyzed product of a crosslinked product of poly(meth) acrylonitrile and a metallic salt thereof.

As the polymer gel whose volume is changed by the change in ion concentration, the electrolyte series polymer gels described above can be exemplified.

As the polymer gel whose volume is changed by the adsorption and desorption of a chemical substance, a strongly ionic polymer gel is preferred. Examples thereof include a crosslinked product of polyvinylsulfonic acid, a crosslinked product of a copolymer of vinylsulfonic acid with (meth)acrylamide, hydroxyethyl(meth)acrylate and/or an alkyl (meth)acrylate, a crosslinked product of polyvinylbenzenesulfonic acid, a crosslinked product of a copolymer of vinylbenzenesulfonic acid with (meth)acrylamide, hydroxyethyl(meth)acrylate and/or an alkyl (meth)acrylate, a crosslinked product of a polyacrylamidealkylsulfonic acid, and a crosslinked product of a copolymer of an acrylamidealkylsulfonic acid with (meth)acrylamide, hydroxyethyl (meth)acrylate and/or an alkyl (meth)acrylate, and these are used in combination with a cationic surface active agent, such as an alkylpyridine, e.g., n-dodecylpyridinium chloride, an alkylammonium salt, a phenylammonium salt and a phosphonium salt such as a tetraphenylphosphonium chloride.

As the polymer gel whose volume is changed by the application of heat (heat-responding polymer gel), a cross linked product of a polymer gel having an LCST (lowest critical solubility temperature) or an HCST (highest critical solubility temperature) is preferred, and examples thereof include a crosslinked product of a poly[alkyl-substituted (meth)acrylamide], such as poly (N-isopropylacrylamide), a crosslinked product of copolymer of an alkyl-substituted (meth)acrylamide with at least one of (meth)acrylic acid or a metallic salt thereof, (meth)acrylamide and an alkyl(meth) acrylate, a crosslinked product of poly(vinyl methyl ether), an IPN (interpenetrating polymer networks) crosslinked product of poly(meth)acrylamide and poly(meth)acrylic acid, and a crosslinked product of an alkyl-substituted cellulose derivative, such as methyl cellulose, ethyl cellulose and hydroxypropyl cellulose.

As the polymer gel whose volume is changed by the application of light (light-responding polymer gel), a crosslinked product of a hydrophilic polymer compound having a group ionicly dissociated by light, such as a triarylmethane derivative and a spyrobenzopyran derivative, and examples thereof include a crosslinked product of a copolymer of a vinyl-substituted triarylmethane leuco dye derivative and acrylamide.

As the polymer gel whose volume is changed by oxidation or reduction by electricity, a cationic polymer gel is exemplified, and a CT complex (charge transfer complex) combined with an electron accepting compound is preferably used. Examples of the cationic polymer gel include a crosslinked product of an polymer of amino-substituted (meth)acrylamide, such as dimethylaminopropylacrylamide, a crosslinked product of polymer of a (meth)acrylic acid amino-substituted alkylester, such as poly (dimethylaminoethyl acrylate), poly(diethylaminoethyl acrylate) and poly(dimethylaminopropyl acrylate), a crosslinked product of polystyrene, a crosslinked product of polyvinylpyridine, a crosslinked product of polyvinylcarbazole and a crosslinked product of polydimethylaminostyrene. Examples of the electron accepting compound include benzoquinone, 7,7,8,8-tetracyanoquinodimethane (TCNQ), tetrabutylammonium perchlorate, tetracyanoethylene, chloranil, trinitrobenzene, maleic anhydride and iodine.

As the polymer gel whose volume is changed by providing a magnetic field, a crosslinked product of poly (vinyl alcohol) containing ferromagnetic particles or a magnetic fluid is exemplified.

As the polymer gel whose volume is changed by the change in solution composition, all the polymer gels exemplified above are exemplified.

Any polymer gel other than those exemplified above may be used as far as its volume is changed by an external stimulus.

The amount of volume change of the polymer gel is preferably as large as possible. The ratio of the volume of the swollen polymer gel to that of the contracted polymer gel is preferably 5 or more, and more preferably 10 or more. When the volume ratio is less than 5, the display contrast becomes insufficient.

The form of the polymer gel is not particularly limited, and various forms, such as a particle form, a block form, a film form, an irregular form and a fibrous form, may be used. The polymer gel preferably has a particle form because it has a high rate of volume change on the external stimulus (responding property) and a wide application range. In the case where the polymer gel has a particle form, the shape thereof is not particularly limited, and a spherical shape, an ellipsoidal shape, a polyhedral shape, a porous shape, an asterisk shape, an acicular shape and a hollow shape can be exemplified. In the case where the polymer gel is in a particle form, the contracted polymer gel preferably has an average particle diameter of from 0.01 µm to 5 mm, and more preferably from 0.1 µm to 1 mm.

The particles can be produced by a general method, such as a method of pulverizing a polymer gel by a physical pulverization method, a method in which a polymer gel before crosslinking is pulverized by a chemical pulverization method and then crosslinked, an emulsion polymerization method, a suspension polymerization method and a dispersion polymerization method.

In order to increase the rate of volume change of the polymer gel on an external stimulus, it is preferred that a porous polymer gel is used to make absorption and release of a liquid easier. The porous polymer gel can be generally obtained by subjecting a swollen polymer gel to freeze-drying.

A coloring matter may be added to the polymer gel. As the coloring matter added, various known pigments and dyes may be used. Preferred specific examples of the pigment include a metallic oxide, such as titanium oxide, bronze powder, carbon black, an anthraquinone series pigment, an azo series pigment, a phthalocyanine series pigment, a quinacridone series pigment, a perylene series pigment and an indigo series pigment, with those having a large light absorbing coefficient being preferred. Primary particles of the pigment preferably have an average diameter of from 0.001 to 1 µm, and more preferably from 0.01 to 0.5 µm. When the average particle diameter is less than 0.001 µm, the coloring matter is liable to flow out from the polymer gel, and when it exceeds 1 µm, there is a possibility of lowering the coloring density.

A pigment having a polar group, such as an acid group, e.g., a carboxyl group and a sulfonic acid group, a hydroxyl group, an amino group, a thiol group, a halogen atom, a nitro group and a carbonyl group, in the molecule, which easily forms agglomerates within the polymer gel when the pigment concentration is high, is preferred.

Preferably the pigment is contained in the polymer gel and does not flow out from the polymer gel. In order to prevent flowing out of the pigment, it is preferred that a pigment having a larger particle diameter than the network of the polymer gel used is used, a pigment having a high physical interaction, such as electric or ionic interaction, with the polymer gel is used, or a pigment having a modified surface is used. Examples of the pigment having a modified surface include a pigment having a group capable of chemically bonding to the polymer gel introduced on the surface thereof and a pigment having a polymer material grafted thereon.

Preferred examples of the dye include an azo dye, an anthraquinone dye, an indigoid dye, a phthalocyanine dye, a carbonium dye, a quinoneimine dye, a methine dye, a quinoline dye, a nitro dye, a benzoquinone dye, a naphthoquinone dye, naphthalmide dye and a perinone dye, with those having a high light absorption coefficient being preferred. Since the dye which is contained in the polymer gel and does not flow out from the polymer gel is preferred, a reactive dye, to which a group capable of chemically reacting with the polymer gel, is particularly preferably used.

In the case where the coloring matter is contained in the polymer gel, the concentration of the coloring matter is preferably the saturated absorbing concentration or higher when the polymer gel contracts. The saturated absorbing concentration herein means a concentration at which the light absorbing efficiency per unit coloring matter is lowered in the condition that the concentration of the coloring matter is sufficiently high. In order to realize such a concentration, the concentration of the coloring matter should be 4% by weight or more, while depending on the light absorbing coefficient of the coloring matter. Therefore, the concentration of the coloring matter when the polymer gel contracts is preferably from 4% to 95% by weight, and more preferably from 10% to 95% by weight. When the concentration of the coloring matter is less than 4% by weight, the saturated absorbing concentration cannot be obtained to make it difficult to exhibit the change in color density depending on change in volume of the polymer gel, and as a result, the thickness of the coloring layer must be made thicker to obtain the sufficient contrast. When the concentration of the coloring matter exceeds 95% by weight, the polymer gel is difficult to swell or contract, and there is a possibility of lowering the responding property to an external stimulus and the amount of volume change.

Even though the total concentration of the coloring matter throughout the polymer gel is lower than the saturated absorption concentration, it is possible that the pigment is contained in the polymer gel in such a manner that when the pigment agglomerates on contraction of the polymer gel, a concentration of the coloring matter higher than the saturated absorption concentration is locally obtained at a part where the pigment agglomerates. Similarly, even though the total concentration of the coloring matter throughout the polymer gel is lower than the saturated absorption concentration, it is possible that the dye is contained in the polymer gel in such a manner that when the dye is concentrated on contraction of the polymer gel, a concentration of the coloring matter higher than the saturated absorption concentration is locally obtained at a part where the dye is concentrated.

In the case where the coloring matter is added to the polymer gel, it is preferred that the light absorption efficiency on swelling of the polymer gel is higher than the light absorption efficiency on contraction of the polymer gel. Accordingly, it is necessary that the amount of the coloring matter to be added to the polymer gel is determined in such a manner that the difference in light absorption efficiency between the case where the polymer gel absorbs the liquid to swell and the case where the polymer gel releases the liquid to contract to a desired value.

The polymer gel containing the coloring matter can be produced by a method in which the coloring matter is dispersed in a polymer before crosslinking and the polymer is then crosslinked, or a method in which a monomer composition containing the coloring matter is polymerized. When the monomer composition containing the coloring matter is polymerized, it is preferred that the polymer and the coloring matter are chemically bonded to each other by using a pigment or a dye having a polymerizable group as described above.

It is preferred that the coloring matter is uniformly dispersed in the polymer gel. It is therefore preferred to use a mechanical kneading method, a stirring method and a dispersing agent.

As the light scattering member, a light scattering material or a polymer material having the light scattering material dispersed therein may be used. The light scattering material preferably has a refractive index different from the refractive index of the liquid used for changing the volume of the polymer gel, and various inorganic materials and organic materials may be used.

Preferred examples of the inorganic material include basic lead carbonate; basic lead sulfate; lead sulfate; lithopone; zinc sulfide; calcium carbonate; gypsum; basic magnesium carbonate; an inorganic oxide, such as muscovite, micanite, micalex, zinc oxide, titanium oxide, antimony oxide, zirconium oxide, alumina, quartz, clay, silica, silicic acid, diatomaceous earth, talc, alumina white, gloss white and satin white; a metallic material, such as zinc, alumel, antimony, aluminum, an aluminum alloy, iridium, indium, osmium, chromium, chromel, cobalt, zirconium, stainless steel, gold, silver, nickel silver, copper, bronze, tin, tungsten, tungsten steel, iron, lead, nickel, a nickel alloy, nickelin, platinum, platinum-rhodium, tantalum, duralmin, nichrome, titanium, Krupp austenitic steel, constantan, brass, platinum-iridium, palladium, a palladium alloy, molybdenum, molybdenum steel, manganese, a manganese alloy, rhodium and rhodium-gold; and an inorganic conductive material, such as ITO (indium tin oxide).

Preferred examples of the organic material include a polymer material, such as a phenol resin, a furan resin, a xylene/formaldehyde resin, a urea resin, a melamine resin, an aniline resin, an alkyd resin, unsaturated polyester, an epoxy resin, polyethylene, polypropylene, polystyrene, poly-p-xylylene, polyvinyl acetate, an acrylic resin, a methacrylic resin, polyvinyl chloride, polyvinylidene chloride, fluorine series plastics, polyacrylonitrile, polyvinyl ether, polyvinyl ketone, polyether, polycarbonate, thermoplastic polyester, polyamide, diene series plastics, polyurethane series plastics, polyphenylene, polyphenylene oxide, polysulfone, an aromatic heterocyclic polymer, silicone, natural rubber series plastics, cellulose series plastics and a mixed material of two or more of them (polymer blend).

The form of the light scattering material is not particularly limited and may be a particle form, a block form, a film form, an irregular form and a fibrous form. The light scattering material is preferably in a particle form because it has a high light scattering property and a wide application range. In the case where the light scattering material is in a particle form, the shape thereof is not particularly limited, and a spherical shape, an ellipsoidal shape, a polyhedral shape, a porous shape, an asterisk shape, an acicular shape and a hollow shape can be used. In the case where the light scattering material is in a particle form, the average particle diameter thereof is preferably from 0.001 $\mu$m to 10$\mu$m, and more preferably from 0.01 $\mu$m to 1 $\mu$m. When the average particle diameter is less than 0.001 $\mu$m or more than 10 $\mu$m, the light scattering effect expected in the light scattering material is lowered. The particles of the light scattering material can be produced by a general physical pulverization method or a chemical pulverization method.

In the case where the light scattering member comprises a polymer material having the light scattering material dispersed therein, the polymer material is not particularly limited, and various polymer resins and polymer gels may be used.

Preferred examples of the polymer resin include the specific examples enumerated for the organic materials of the light scattering material. Preferred examples of the polymer gel (hereinafter referred to as a light scattering polymer gel) include the polymer gels described in the foregoing. It is preferred that the property of volume change of the light scattering polymer gel is opposite to that of the polymer gel constituting the optical material (hereinafter referred to as an optical material polymer gel). In other words, it is preferred that when the optical material polymer gel swells, the light scattering polymer gel contracts, and when the optical material polymer gel contracts, the light scattering polymer gel swells. Examples of the combination of the polymer gels exhibiting such a behavior include a combination of an electrolyte polymer gel forming a metallic salt and an electrolyte polymer gel forming a hydrochloride. The volumes thereof are changed by change of pH. Any one of the electrolyte polymer gels may be used as the optical material polymer gel. Any polymer gel other than these that exhibits volume change opposite to the volume change of the optical material polymer gel may be used as the light scattering polymer gel. A polymer gel whose volume is not changed may also be used as the light scattering polymer gel.

Examples of the method for producing the polymer material having the light scattering material dispersed therein include a method, in which the light scattering material is put in a solution obtained by dissolving the polymer material in a solvent, followed by uniformly dispersing, and the resulting mixture is heated; a method, in which the light scattering material is put in the polymer material melted by heating, followed by uniformly dispersing; a method, in which the light scattering material is uniformly dispersed in a precursor monomer of the polymer material, and the monomer is polymerized; and a method, in which the light scattering material is uniformly dispersed in a polymer before crosslinking, and the polymer is crosslinked. Other methods than the above methods may be employed as far as the light scattering material can be substantially uniformly dispersed in the polymer material.

In the case where the solution obtained by dissolving the polymer material in the solvent is used, the solvent is preferably those capable of dissolving the polymer material and having a relatively low boiling point, specifically 150° C. of less, and more preferably 100° C. or less. Any solvent meeting the requirements can be used, and examples thereof include a ketone, such as acetone, an alcohol, such as ethanol and methanol, an carboxylate, such as ethyl acetate, an aromatic hydrocarbon, such as toluene and xylene, a halogenated hydrocarbon, such as methylene chloride, an ether, such as diethyl ether, a hydrocarbon, such as hexane and cyclohexane, and a mixture thereof.

An apparatus used for mixing and dispersing the materials is not particularly limited, and examples thereof include a disperser, a roller mill, a ball mill, an attritor, a sand grinder, a homogenizer and a Henschel mixer.

As the heating apparatus, a hot air heater, an infrared heater, a high frequency heater and a heat roller may be used but is not limited to these. The heating temperature may be about from 50 to 120° C.

In the case where the light scattering member comprises a polymer material having the light scattering material dispersed therein, the concentration of the light scattering material in the polymer material is preferably from 0.1% to 95% by weight, and more preferably from 10% to 70% by weight. When the concentration of the light scattering material is less than 0.1% by weight, the light scattering property is lowered since the amount of the light scattering material per unit area of the light scattering member is small. When the concentration of the light scattering material exceeds 95% by weight, the light scattering efficiency per one particle of the light scattering material is lowered to decrease the light scattering property.

The form of the light scattering member comprising the polymer material having the light scattering material dispersed therein may be those enumerated for the light scattering material, and the light scattering member is preferably in a particle form since it is easily produced and has a wide application range. The shape of the particle may be those described in the foregoing. The size of the light scattering member is desirably smaller than the size of the contracted polymer gel, so as to sufficiently control the quantity of light incident onto the polymer gel. It is also preferred that the size of the light scattering member is sufficiently larger than the size of the light scattering material. For example, in the case where the light scattering member is in a particle form, the average particle size is preferably from 0.01 µm to 1 mm, and more preferably from 0.1 µm to 100 µm.

In order to produce the particles of the polymer material containing the light scattering material, a bulk material of the polymer material containing the light scattering material produced by the manner described above may be pulverized by a physical pulverization method. In the case of the production method using the precursor monomer of the polymer material or the polymer before crosslinking, a method may be employed, in which a solution of the precursor monomer of the polymer material containing the light scattering material or the polymer solution containing the light scattering material before crosslinking is made into a particle form by a chemical pulverization method, and then they are polymerized or crosslinked, that is, a general polymerization method, such as an emulsion polymerization method, a suspension polymerization method and a dispersion polymerization method, may be employed.

The surface of the polymer gel is covered with the light scattering member by mixing the light scattering member produced as above with the polymer gel. It is preferred that the light scattering member is fixed on the surface of the polymer gel to prevent dropping off from the surface of the polymer gel.

In order to fix the light scattering member on the surface of the polymer gel, a physical fixing method using an adhesive and a chemical fixing method using a chemical bond may be used. Examples of the adhesive used for physically fixing the light scattering member on the surface of the polymer gel include an organic solvent evaporation type adhesive (e.g., a chloroprene rubber series and a urethane series), a thermosetting reaction type adhesive (e.g., an epoxy series and a resol series), a moisture-setting reaction type adhesive (e.g., a 2-cyanoacrylate series and a silicone series), an ultraviolet-setting reaction type adhesive (e.g., an acrylic series oligomer), a condensation reaction type adhesive (e.g., a urea resin series), an addition reaction type adhesive (e.g., an epoxy series and an isocyanate series), and a hot-melt adhesive (e.g., a polyester).

The amount of the adhesive used is preferably from 0.1 parts to 50 parts by weight, and more preferably from 1 part to 30 parts by weight, per 100 parts by weight of the polymer gel. When the amount of the adhesive exceeds 50 parts by weight, although the fixation of the light scattering member is improved, the proportion of contacting the polymer gel with the adhesive is increased to bring about a possibility that the adhesive inhibits volume change of the polymer gel. When the amount of the adhesive is less than 0.1 part by weight, on the other hand, the light scattering member cannot be firmly fixed on the surface of the polymer gel.

The adhesive may be used in the form of fine particles or an adhesive solution.

In the case where adhesive fine particles are used, the heated polymer gel or light scattering member is mixed with the adhesive fine particles, to prepare the polymer gel or the light scattering member, on which the adhesive fine particles are fixed by heat. Thereafter, the polymer gel thus prepared is mixed with a light scattering member, or the light scattering member thus prepared is mixed with a polymer gel, and the mixture obtained is heated to produce the polymer gel having the light scattering member adhered on the surface thereof. Other methods using the adhesive fine particles than described above may be employed.

In the case where the adhesive solution is used, the polymer gel or the light scattering member is subjected to spraying, coating or impregnation of the adhesive solution to prepare the polymer gel or the light scattering member having an appropriate amount of the adhesive solution attached to the surface thereof. Thereafter, the polymer gel thus prepared is mixed with a light scattering member, or the light scattering member thus prepared is mixed with a polymer gel, and the mixture obtained is heated to produce the polymer gel having the light scattering member adhered on the surface thereof. Other methods using the adhesive solution than described above may be employed.

The apparatus used for spraying and mixing in the methods described above is not particularly limited, and examples thereof include a general mixing apparatus, such as a coating granulation apparatus, such as a pan coating apparatus, a rolling coating apparatus and a fluidized coating apparatus, a pony mixer, a flow jet mixer, a Henschel mixer, a speed mixer, a Dyno mixer, a conical blender, a Nautor mixer, a V-shaped blender and a turbulizer.

The apparatus used for heating in the methods described above is not particularly limited, and those described in the foregoing may be employed. The heating temperature is higher than the melting temperature of the adhesive and is about from 50° C. to 120° C.

In the case where the adhesive solution is used, the solvent is preferably those capable of dissolving the adhesive and having a relatively low boiling point, specifically 150° C. of less, and more preferably 100° C. or less. The solvent is preferably selected in such a manner that the volume of the polymer gel swollen by absorbing the solvent is 100 times or less, preferably 10 times or less, the volume of the contracted polymer gel. When the volume of the polymer gel swollen with the solvent exceeds 100 times that of the contracted polymer gel, there is a possibility that the adhesive invades into the interior of the polymer gel to inhibit the volume change of the polymer gel. There is also another possibility that the light scattering member invades into the interior of the polymer gel when fixing the light scattering member on the polymer gel to lower the light scattering effect on the surface of the polymer gel. The solvent is not particularly limited as far as the conditions described above are satisfied, and specifically those enumerated as the solvent used for the solution formed by dissolving the polymer material can be used.

Examples of the chemical bond in chemically fixing the light scattering member on the polymer gel include an ionic bond, a hydrogen bond and a covalent bond. The covalent bond is the most preferred since a firm fixation can be obtained. In order to bond the light scattering member and the polymer gel by a covalent bond, a catalyst (reaction initiator) and various fixing agents are used.

The catalyst is used in the case where the light scattering member having on the surface thereof a reactive group capable of bonding to the surface of the polymer gel by a covalent bond is used. For example, in the case where the polymer gel having a carboxyl group on the surface thereof and the light scattering member having a hydroxyl group on the surface thereof are bonded by a covalent bond through a dehydration reaction, sulfuric acid or hydrochloric acid is used as the catalyst.

The fixing agent is applied on the surfaces of the polymer gel and the light scattering member and fixes the surface of the polymer gel and the surface of the light scattering member to each other by carrying out a chemical reaction. In order to apply the fixing agent on the surfaces of the polymer gel and the light scattering agent, spraying, coating or impregnation can be employed. On spraying, coating or impregnating the fixing agent on the polymer gel and the light scattering member, the fixing agent is used singly or in combination with various solvents.

In the case where the fixing agent is used in combination with the solvent, the solvent is preferably that which is capable of dissolving the fixing agent and having a relatively low boiling point, specifically 150° C. of less, and more preferably 100° C. or less. In the case where there is a possibility of contacting the polymer gel with the solvent, the solvent is preferably selected in such a manner that the volume of the polymer gel swollen by absorbing the solvent is 100 times or less, preferably 10 times or less the volume of the contracted polymer gel. When the volume of the polymer gel swollen with the solvent exceeds 100 times the volume of the contracted polymer gel, there is a possibility that the adhesive invades into the interior of the polymer gel to inhibit the volume change of the polymer gel. There is also another possibility that the light scattering member invades into the interior of the polymer gel in fixing the light scattering member on the polymer gel to lower the light scattering effect on the surface of the polymer gel. The solvent is not particularly limited as far as the conditions described above are satisfied, and specifically those enumerated as the solvent used for the solution formed by dissolving the polymer material can be used.

When the fixing agent is used, a method can be employed, in which the fixing agent is added to the polymer gel and the light scattering agent, and the resulting mixture is heated to the reaction temperature inherent in the fixing agent to form a chemical bond, so that the light scattering member is fixed on the surface of the polymer gel. Furthermore, a stepwise method can also be employed, in which after treating the surface of the polymer gel or the light scattering agent with the fixing agent, the polymer gel or the light scattering member thus treated is added to the light scattering member or the polymer gel, which are then fixed to the surface of the polymer gel or the light scattering member thus treated via the reactive group formed on the surface.

As the fixing agent, a compound having two or more polymerizable unsaturated groups and/or reactive functional groups can be exemplified. Examples of the compound having two or more polymerizable unsaturated groups include a di- or tri(meth)acrylate of a polyol, such as ethylene glycol, propylene glycol, trimethylol propane, glycerin, polyoxyethylene glycol, polyoxypropylene glycol and polyglycerine; an unsaturated polyester obtained by reacting the above polyol with an unsaturated acid, such as maleic acid and fumaric acid; a bis(meth)acrylamide, such as N,N'-methylenebis(meth)acrylamide; a di(meth)acrylic acid carbamate ester obtained by reacting a polyisocyanate, such as trilenediisocyanate and hexamethlenediisocyanate, with hydroxyethyl (meth)acrylate; and a polyvalent allyl series, such as allylated starch, allylated cellulose, diallyl phthalate, tetrallyloxyethane, pentaerythritol triallyl ether, trimethylolpropane triallyl ether, diethylene glycol diallyl ether and triallyl trimethyl ether. Among these, ethylene glycol di(meth)acrylate, propylene glycol di(meth)acrylate, polyethylene glycol di(meth)acrylate, polypropylene glycol di(meth)acrylate and N,N'-methylenebis(meth)acrylamide are preferably used.

Examples of the compound having two or more reactive functional groups include a diglycidyl ether compound, a haloepoxy compound and a di- and triisocyanate compound. Specific examples of the diglycidyl ether compound include ethylene glycol diglycidyl ether, polyethylene glycol diglycidyl ether, propylene glycol diglycidyl ether, polypropylene glycol diglycidyl ether, glycerin diglycidyl ether and polyglycerin diglycidyl ether. Specific examples of the haloepoxy compound include epichlorohydrin, epibromohydrin and β-methylepichlorohydrin. Specific examples of the diisocyanate compound include 2,4-tolylene diisocyanate and hexamethylene diisocyanate. Among these, ethylene glycol diglycidyl ether and hexamethylene diisocyanate are preferably used in the invention.

The amount of the fixing agent used is preferably from 0.001 to 50 parts by weight, and more preferably from 0.01 to 30 parts by weight, per 100 parts by weight of the dry weight of the polymer gel. When the amount of the fixing agent is less than 0.001 part by weight, the light scattering member cannot be fixed on the surface of the polymer gel. When the amount of the fixing agent exceeds 50 parts by weight, there is a possibility that the fixing agent attached on the surface of the polymer gel inhibits the volume change of the polymer gel.

In the case where the fixation of the light scattering member on the surface of the polymer gel is naturally maintained even when the volume change of the polymer gel is repeated, the physical or chemical fixation treatment may not be conducted.

It is preferred in the invention that the substantially whole surface of the polymer gel is covered with the light scattering member when the polymer gel contracts. For example, in the case where the contracted polymer gel in the form of a particle has a particle diameter of 10 $\mu$m and a specific gravity of 1.2, and the light scattering member is in a particle form having a specific gravity of 2.0 and a particle diameter of 0.2 $\mu$m, such a condition can be attained by adding 12 parts by weight of the light scattering member to 100 parts by weight of the contracted polymer gel. In the case where the light scattering member is in a particle form having an average specific gravity of 1.5 and a particle diameter of 1 $\mu$m, such a condition can be attained by adding 49 parts by weight of the light scattering member to 100 parts by weight of the contracted polymer gel.

However, an actual amount of the light scattering member relative to the amount of the polymer gel is determined by the reflectivity of the light scattering member when the polymer gel contracts and is not limited to the amounts described above as far as sufficient change in optical density can be obtained by the volume change by swelling or contraction of the polymer gel.

In the optical device according to the invention, the optical material and a liquid are kept between two substrates. In the device having such a constitution, a stimulus such as light, heat, electricity or a magnetic field is applied, and the optical material responds to the stimulus to exhibit an optical modulation such as change in reflectivity or change in optical density.

As the substrate, a film or plate substrate of polyester, polyimide, polymethyl(meth)acrylate, polystyrene, polypropylene, polyethylene, nylon or polyvinyl chloride, a glass substrate, a metal and ceramics may be used. It is preferred that at least one substrate comprises a transparent material.

As the liquid used for changing the volume of the polymer gel, a liquid capable of being absorbed by the polymer gel, i.e., a liquid having a good affinity with the polymer constituting the polymer gel, is preferred. For example, water, an electrolyte aqueous solution, an alcohol, a ketone, dimethylformamide, dimethylacetoamide, dimethylsufoxide, acetonitrile, propylene carbonate and a mixture thereof can be used. Furthermore, a surface active agent adsorbed by or released from the polymer gel, an acid, an alkali or a salt for accelerating the pH change of the liquid, a dispersion stabilizer, an antioxidant and an ultraviolet stabilizer may be added to the liquid. The electron accepting compound described above may also be added to form a CT complex with the cationic polymer gel.

While the optical device of the invention may further comprise a means for providing the external stimulus to the cell, the means for providing the stimulus may not be provided in the case where the optical device is used as a light control device, such as light control glass, or a sensor utilizing a stimulus existing in nature, such as natural light or heat, as the external stimulus.

Figure 3:
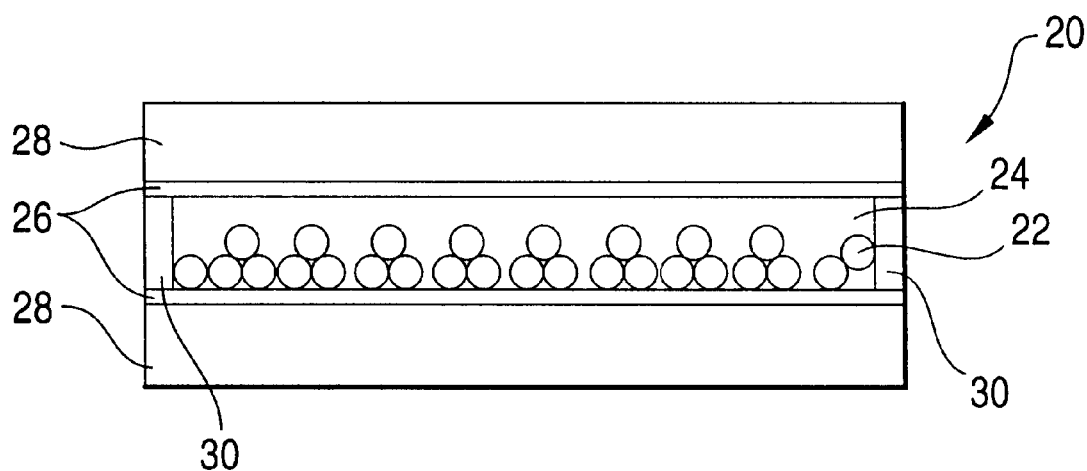
FIG. 3 is a schematic cross-sectional view showing one embodiment of the optical device according to the invention.

FIG. 3 is a schematic cross-sectional view showing a preferred embodiment of the optical device. In the optical device 20 shown in FIG. 3, an optical material 22 and a liquid 24 are sealed in a sealed space formed by a pair of substrates 28 having means for providing a stimulus 26 on the inner surface thereof and a pair of spacers 30.

As the means for providing a stimulus, means for providing an electric stimulus, heat or laser light are preferred. In the case where an electric stimulus is provided, an electrode formed with a metallic film, a conductive polymer or a combination of a polymer and metallic particles is preferred as the means for providing a stimulus. As the heating means, a combination of the electrode described above with a resistance heating element, such as a metal, a metallic oxide and carbon, is preferred. The means for providing a stimulus may be provided on either the inner surface or the outer surface of the cell.

In the case where an electric stimulus is provided to the optical material, a polymer gel, the volume of which is changed by the change in pH, adsorption and desorption of a chemical substance, such as a surface active agent, oxidation or reduction, is preferably used. In the case where heat is applied to the optical material, the heat-responding polymer gel described in the foregoing is preferably used. Furthermore, in the case where the optical material is irradiated with external light, the light-responding polymer gel described in the foregoing is preferably used.

The layer of the optical material 22 in the optical device of the invention is preferably from 1 $\mu$m to 500 $\mu$m, and more preferably from 2 $\mu$m to 200 $\mu$m. When the thickness of the layer is less than 1 $\mu$m, the coloring density and the light scattering property are lowered, and the desired contrast cannot be obtained, and when it exceeds 500 $\mu$m, there is a possibility that the response characteristics are deteriorated.

In the optical device associated with color change, only one species of the optical material may be used, or plural species of the optical materials having different colors may be used. In the case where the plural optical materials having different colors are used, segments are provided on the plane of the optical device, and the colored polymer gels containing pigments having different colors are appropriately arranged in the respective segments, so as to conduct coloring or display in full-color.

The optical device of the invention can be applied to a light control device or a filter for controlling quantity of reflected light, and a black-and-white or color display device for displaying an image. Furthermore, by using a polymer gel responding to the addition of a solvent or a chemical substance and a non-sealed cell, the optical device of the invention can be used as a sensor for detecting such addition by the change in light scattering and/or change in color density caused by the solvent or the chemical substance being in contact with the optical material in the call.

The invention will be described in more detail with reference to the following examples, but the invention is not construed as being limited thereto.

EXAMPLE 1

100 parts by weight of a sodium salt of carboxymethyl cellulose (BS-H, trade name, produced by Dai-ichi Kogyo Seiyaku Co., Ltd.) as a precursor of a polymer gel for an optical material and 12 parts by weight of sodium hydroxide were put into 1,000 parts by weight of distilled water, followed by sufficiently stirring, to prepare a uniform solution. The solution and 14 parts by weight of epichlorohydrin as a crosslinking agent were mixed, and the mixture was heated at 60° C. for 6 hours to produce a polymer gel in a bulk form. The bulk of the polymer gel thus produced was subjected to coarse pulverization to blocks of about 0.1 $cm^3$, which were easily filtrated, the blocks thus obtained were washed with a large amount of distilled water. After washing, the polymer gel in a block form sufficiently swollen with distilled water was pulverized in a homogenizer (AM-6 produced by Nippon Seiki Co., Ltd.) at 7,000 rpm for 30 minutes. 8,000 parts by weight of acetone was then gradually added to 2,000 parts by weight of the swollen polymer gel particles with sufficiently stirring, so that the polymer gel particles contracted. Thereafter, the polymer gel particles were recovered by filtering with suction, followed by drying. The resulting polymer gel particles had an average particle diameter of about 10 $\mu$m in a dried state (contracted state) The water absorption thereof was about 300 g/g.

The resulting polymer gel particles could reversibly repeat swelling and contraction by change in pH, change in ion concentration and change in solvent composition, and the particle diameter on swelling was about 6 times that on contraction.

40 parts by weight of a saturated thermoplastic high-molecular weight polyester resin (Vylon 200, trade name, produced by Toyobo Co., Ltd.) was put in a mixed solvent comprising 100 parts by weight of toluene and 100 parts by weight of methyl ethyl ketone, and was sufficiently dissolved to obtain an adhesive solution. 100 parts by weight of the dried polymer gel particles for the optical material produced previously was put in the solution, and the mixture was stirred in a homogenizer (AM-6 produced by Nippon Seiki Co., Ltd.) for 30 minutes. Since the polymer gel did not swell with the mixed solvent of toluene and methyl ethyl ketone, the adhesive did not invade into the interior of the polymer gel but was attached on only the surface of the polymer gel particles. The polymer gel particles were taken out from the adhesive solution and dried in air strongly blowing, so that the polymer gel particles did not agglomerate.

100 parts by weight of the polymer gel particles was added to 500 parts by weight of titanium oxide particles (refractive index: 2.7) having an average particle diameter of 0.2 $\mu$m as a light scattering member composed only of a light scattering material, followed by mixing in a V-shaped blender, so that the substantially whole surface of the dried (contracted) polymer gel particles was covered with the light scattering member. The mixture was then heated at 90° C. for 24 hours to adhere the light scattering member on the surface of the polymer gel particles. The polymer gel particles having the light scattering member attached on the surface thereof was then cooled to obtain an optical material comprising the polymer gel particles, the surface of which was covered with the light scattering member.

The functions of the optical material thus obtained were evaluated as follows.

3.3 parts by weight of the recovered optical material was mixed with 1,000 parts by weight of acetone to prepare a dispersion solution of the optical material. The dispersion solution was filtered with suction by using a black filter, and the optical material was uniformly dispersed and adhered on the black filter. The optical density of the black filter before adhesion of the optical material was about 1.6. When an aqueous sodium chloride of pH 9 (a liquid absorbed by or released from the polymer gel: water (refractive index: 1.33)) was poured onto the black filter having the optical material adhered, the polymer gel immediately swelled to become transparent, and the optical density became about 1.5. When a hydrochloric acid of pH 3 was then poured onto the black filter, the polymer gel immediately contracted to become opaque (light scattering state), and the optical density became about 0.60. It was thus confirmed that the transmitted quantity of light and the light scattering property of the optical material were changed by the change in pH, and the optical density was largely changed. When the aqueous sodium hydroxide was again poured onto the black filter to make the optical material weakly alkaline, pH 9, the polymer gel again swelled to become transparent, and the optical density became about 1.5. It was thus confirmed that the optical density was reversibly changed.

During the evaluation described above, the amount of the light scattering member covering the surface of the polymer gel was constant irrespective of the pH. It was therefore considered that the distance among the light scattering members was changed by the volume change of the polymer gel particles, and the exposed area of the polymer gel particles was changed to largely change the light scattering efficiency, so that the optical density was largely increased or decreased. It was thus confirmed that in the optical material of this example, the transmittance and the optical density were greatly changed by the volume change thereof, and the change was reversible.

EXAMPLE 2

A polymer gel for the optical material was prepared in the following manner. 100 parts by weight of acrylic acid as a main monomer was put in a beaker, and 165 parts by weight of a 25% by weight of aqueous sodium hydroxide was added dropwise to the acrylic acid with cooling and stirring to neutralize about 74% by mol of acrylic acid. Thereafter, a solution obtained by dissolving 0.5 part by weight of ammonium persulfate in 10 parts by weight of distilled water and 0.5 part by weight of N,N'-methylenebisacrylamide as a crosslinking agent were added to the mixture, and a uniform solution was prepared with sufficiently stirring. The resulting solution was added, in a beaker, to a solution obtained by dissolving 5.0 parts by weight of a sorbitol series surface active agent (Sorgen 50, trade name, produced by Dai-ichi Kogyo Seiyaku Co., Ltd.) as a dispersion stabilizer in 500 parts by weight of cyclohexane, followed by substituting with nitrogen, and then emulsified by stirring at a high speed with a rotary stirring blade at 5,000 rpm for 10 minutes. The temperature of the emulsion was adjusted to 25° C., a 50% by weight cyclohexane solution of N,N,N'N'-tetramethylethylenediamine was added to the emulsion with stirring to polymerize the monomer. After the polymerization, the resulting polymer gel particles were recovered and repeatedly washed with distilled water, followed by drying. The resulting polymer gel particles in a dried state had an average particle diameter of about 10 $\mu$m. The water absorption of the polymer gel particles was about 250 g/g.

The resulting polymer gel particles could reversibly repeat swelling and contraction by change in pH, change in ion concentration and change in solvent composition, and the particle diameter on swelling was about 5 times that on contraction.

A light scattering member comprising a polymer material (polymer resin) having a light scattering material dispersed therein was produced in the following manner. 20 parts by weight of a saturated thermoplastic high-molecular weight polyester resin (Vylon 200, trade name, produced by Toyobo Co., Ltd.) was put in a mixed solvent comprising 65 parts by weight of toluene and 5 parts by weight of methyl ethyl ketone, to prepare a polymer solution. 20 parts by weight of aluminum (refractive index: 0.8) having an average particle diameter of 0.2 $\mu$m as the light scattering material and 5 parts by weight of a bisphenol A series epoxy resin (Epikote 828, trade name, produced by Shell Chemical Co., Ltd.) as a crosslinking agent were added to the polymer solution, followed by stirring in a homogenizer (AM-6 produced by Nippon Seiki Co., Ltd.) for 30 minutes. 115 parts by weight of the mixed solution was added to a solution formed by dissolving 3 parts by weight of a polyoxyethylene nonylphenyl ether series surface active agent (Emulgen 909, trade name, produced by Kao Corp.) as a dispersion stabilizer in 500 parts by weight of distilled water, and was suspended by stirring at a high speed with a rotary stirring blade at 5,000 rpm for 10 minutes. The suspension was then heated to 120° C. for 24 hours to evaporate the mixed organic solvent contained in the suspension and to crosslink Vylon 200 to obtain a light scattering member in a particle form. The particles of the light scattering member thus formed were recovered and dried. The resulting light scattering member had an average particle diameter of about 1 $\mu$m.

200 parts by weight of ethylene glycol diglycidyl ether as a fixing agent was added to 1,000 parts by weight of toluene to prepare a fixing agent solution. 100 parts by weight of the polymer gel particles prepared above was put in the fixing agent solution, and stirred in a homogenizer (AM-6 produced by Nippon Seiki Co., Ltd.) for 30 minutes. Since the polymer gel did not swell with toluene, the fixing agent did not invade into the interior of the polymer gel but was attached on only the surface of the polymer gel particles. Thereafter, the polymer gel particles were taken out from the fixing agent solution and dried in air strongly blowing at a low temperature (about 5° C.), so that the polymer gel particles did not agglomerate.

5 parts by weight of the polymer gel particles was added to 40 parts by weight of the light scattering member prepared above, followed by mixing in a V-shaped blender, so that the substantially whole surface of the dried (contracting) polymer gel particles was covered with the light scattering member. The mixture was then heated at 90° C. for 24 hours to fix the light scattering member on the surface of the polymer gel particles. The polymer gel particles having the light scattering member attached on the surface thereof was then cooled to obtain an optical material comprising the polymer gel particles, the surface of which was covered with the light scattering member.

The functions of the optical material thus obtained were evaluated as follows. 3.3 parts by weight of the dried optical material was dispersed in 1,000 parts by weight of acetone to prepare a dispersion solution of the optical material. The dispersion solution was filtered with suction by using a black filter, and the optical material was uniformly dispersed and adhered on the black filter. The optical density of the black filter before adhesion of the optical material was about 1.6. When distilled water (refractive index: 1.33) was poured onto the black filter having the optical material adhered, the polymer gel immediately swelled to become transparent, and the optical density became about 1.5. When acetone was then poured onto the black filter, the polymer gel immediately contracted to become opaque (light scattering state), and the optical density became about 0.60. It was thus confirmed that the quantity of transmitted light and the light scattering property of the optical material were changed by the change in solvent composition, and the optical density was largely changed. When distilled water was again poured onto the black filter, the polymer gel again swelled to become transparent, and the optical density became about 1.5. It was thus confirmed that the optical density was reversibly changed.

During the evaluation described above, the amount of the light scattering member covering the surface of the polymer gel was constant irrespective of the solvent composition. It was therefore considered that the distance among the light scattering members was changed by the volume change of the polymer gel particles, and the exposed area of the polymer gel particles was changed to largely change the light scattering efficiency, so that the optical density was largely increased or decreased.

It was thus confirmed that in the optical material of this example, the transmittance and the optical density were greatly changed by the volume change thereof, and the change was reversible.

EXAMPLE 3

A polymer gel for the optical material was prepared in the following manner. 100 parts by weight of a sodium salt of carboxymethyl cellulose (BS-H, trade name, produced by Dai-ichi Kogyo Seiyaku Co., Ltd.) as a precursor of the polymer gel, 12 parts by weight of sodium hydroxide and 100 parts by weight of a phthalocyanine series blue pigment (average particle diameter: 0.2 $\mu$m) as a coloring matter were put into 1,000 parts by weight of distilled water, followed by stirring in a homogenizer (AM-6 produced by Nippon Seiki Co., Ltd.) for 10 minutes, to prepare a uniform dispersion solution. 14 parts by weight of epichlorohydrin as a crosslinking agent was added to the dispersion solution, and the mixture was heated at 60° C. for 6 hours to produce a colored polymer gel in a bulk form (coloring matter concentration: 50% by weight). The bulk of the colored polymer gel thus produced was subjected to coarse pulverization to blocks of about 0.1 cm$^3$, which were easily filtrated, the blocks thus obtained were washed with a large amount of distilled water. After washing, the polymer gel in a block form sufficiently swelling with distilled water was pulverized in a homogenizer (AM-6 produced by Nippon Seiki Co., Ltd.) at 5,000 rpm for 30 minutes. 8,000 parts by weight of acetone was then gradually added to 2,000 parts by weight of the swollen colored polymer gel particles with sufficiently stirring, so that the colored polymer gel particles contracted. Thereafter, the colored polymer gel particles were recovered by filtering with suction, followed by drying. The resulting colored polymer gel particles had an average particle diameter of about 10 $\mu$m in a dried state (contacted state). The water absorption of the colored polymer gel particles to distilled water was about 250 g/g.

The resulting colored polymer gel particles could reversibly repeat swelling and contraction by change in pH, change in ion concentration and change in solvent composition, and the particle diameter on swelling was about 5 times that on contraction.

70 parts by weight of a bisphenol A series epoxy resin (Epikote 828, trade name, produced by Shell Chemical Co., Ltd.) as a thermosetting reaction type adhesive and 10 parts by weight of aminodiphenylmethane as a hardening agent were added to 320 parts by weight of toluene, to prepare an adhesive solution. 100 parts by weight of the colored polymer gel was put in the adhesive solution, followed by stirring in a homogenizer (AM-6 produced by Nippon Seiki Co., Ltd.) for 30 minutes. Since the colored polymer gel did not swell with toluene, the fixing agent did not invade into the interior of the colored polymer gel but was attached on only the surface of the colored polymer gel particles. Thereafter, the colored polymer gel was taken out from the adhesive solution and dried in air strongly blowing at a low temperature (about 5° C.), so that the colored polymer gel particles did not agglomerate.

100 parts by weight of the colored polymer gel was added to 500 parts by weight of alumina particles (refractive index: 1.77) having an average particle diameter of 0.2 $\mu$m as a light scattering member composed only of a light scattering material, followed by mixing in a V-shaped blender, so that the substantially whole surface of the dried colored polymer gel particles was covered with the light scattering member. The mixture was then heated at 120° C. for 24 hours to adhere the light scattering member on the surface of the colored polymer gel particles. The colored polymer gel particles having the light scattering member attached on the surface thereof was then cooled to obtain an optical material comprising the colored polymer gel particles, the surface of which was covered with the light scattering member.

The functions of the optical material thus obtained were evaluated as follows.

3.3 parts by weight of the resulting optical material was mixed with 1,000 parts by weight of acetone to prepare a dispersion solution of the optical material. The dispersion solution was filtered with suction by using a white filter, and the optical material was uniformly dispersed and adhered on the white filter. The optical density of the white filter before adhesion of the optical material was about 0.15. When an aqueous sodium hydroxide of pH 9 (a liquid absorbed by or released from the polymer gel: water (refractive index: 1.33)) was poured onto the filter having the optical material adhered, the polymer gel immediately swelled to change the color of the optical material to blue, and the optical density measured at a wavelength of 600 nm became about 1.0. When a hydrochloric acid of pH 3 was then poured onto the white filter, the polymer gel immediately contracted to become opaque (light scattering state), and the optical density measured at a wavelength of 600 nm became about 0.21. It was thus confirmed that the optical material colored or discolored by the change in pH, and the optical density was largely changed. When the aqueous sodium hydroxide was again poured onto the white filter to make the optical material to weakly alkaline, pH 9, the polymer gel again swelled to color, and the optical density measured at a wavelength of 600 nm became about 1.0. It was thus confirmed that the optical density was reversibly changed.

During the evaluation described above, the amount of the light scattering member covering the surface of the polymer gel was constant irrespective of the pH. It was therefore considered that the distance among the light scattering members was changed by the volume change of the polymer gel particles, and the exposed area of the polymer gel particles was changed to largely change the light scattering efficiency, so that the optical density was largely increased or decreased.

It was thus confirmed that the optical material of this example colored or discolored by the volume change thereof, and the change was reversible.

EXAMPLE 4

A polymer gel for the optical material was prepared in the following manner. 200 parts by weight of acrylic acid as a main monomer was put in a beaker, and 330 parts by weight of a 25% by weight aqueous sodium hydroxide was added dropwise to the acrylic acid with cooling and stirring to neutralize about 74% by mol of acrylic acid. Thereafter, a solution obtained by dissolving 1.0 part by weight of ammonium persulfate in 20 parts by weight of distilled water, 100 parts by weight of carbon black having an average diameter of 0.1 $\mu$m (Showblack, trade name, produced by Showa Cabot Co., Ltd.) as a coloring matter and 1.0 part by weight of N,N'-methylenebisacrylamide as a crosslinking agent were added to the mixture and stirred in a homogenizer (AM-6 produced by Nippon Seiki Co., Ltd.) for 10 minutes to prepare a uniform dispersion solution. The resulting dispersion solution was added, in a beaker, to a solution obtained by dissolving 10 parts by weight of a sorbitol series surface active agent (Sorgen 50, trade name, produced by Dai-ichi Kogyo Seiyaku Co., Ltd.) as a dispersant in 1,000 parts by weight of cyclohexane, followed by substituting with nitrogen, and then emulsified.

The temperature of the resulting emulsion was adjusted to 25° C., and a 50% by weight cyclohexane solution of N,N,N'N'-tetramethylethylenediamine was added to the emulsion with stirring to polymerize the monomer. After the polymerization, the resulting colored polymer gel (coloring matter concentration: 29% by weight) was recovered and repeatedly washed with distilled water, followed by drying. The resulting polymer gel particles in a dried state had an average particle diameter of about 10 $\mu$m. The resulting colored polymer gel particles could reversibly repeat swelling and contraction by change in pH, change in ion concentration and change in solvent composition, and the particle diameter on swelling was about 5 times that on contraction.

20.0 parts by weight of methacrylamide trimethylammonium hydrochloride as a main monomer of a polymer gel for a light scattering member was added to 33 parts by weight of distilled water. A solution formed by dissolving 0.1 part by weight of ammonium persulfate in 2 parts by weight of distilled water, 10.0 parts by weight of titanium oxide having an average diameter of 0.2 $\mu$m (refractive index: 2.7) as a light scattering material and 0.1 part by weight of N,N'-methylenebisacrylamide as a crosslinking agent were added to the resulting solution, to prepare a uniform solution by sufficiently stirring. The resulting dispersion solution was added, in a beaker, to a solution obtained by dissolving 1.0 part by weight of a sorbitol series surface active agent (Sorgen 50, trade name, produced by Dai-ichi Kogyo Seiyaku Co., Ltd.) as a dispersion stabilizer in 100 parts by weight of cyclohexane, followed by substituting with nitrogen, and then emulsified by stirring at a high speed with a rotary stirring blade at 10,000 rpm for 10 minutes.

The temperature of the emulsion was adjusted to 25° C., and a 50% by weight cyclohexane solution of N,N,N'N'-tetramethylethylenediamine was added to the emulsion with stirring to polymerize the monomer. After the polymerization, the resulting polymer gel particles were recovered and repeatedly washed with distilled water, followed by drying, to obtain a light scattering member comprising the polymer gel and the light scattering material dispersed in the polymer gel. The resulting polymer gel for the light scattering member in a dried state had an average particle diameter of about 1 $\mu$m. The polymer gel for the light scattering member had a property of swelling under an acidic condition, and the average particle diameter on swelling was about 3 $\mu$m. The polymer gel for the light scattering member had a property of contracting under an alkaline condition, and the average particle diameter on contraction was about 1.1 $\mu$m. On the other hand, the colored polymer gel for the optical material previously prepared swelled under an alkaline condition but contracted under an acidic condition, and therefore it was confirmed that the polymer gel for the light scattering member exhibited volume change exactly apposite to what the colored polymer gel for the optical material did.

200 parts by weight of ethylene glycol diglycidyl ether was added to 1,000 parts by weight of toluene to prepare a fixing agent solution. 100 parts by weight of the colored polymer gel prepared above was put in the fixing agent solution and stirred in a homogenizer (AM-6 produced by Nippon Seiki Co., Ltd.) for 30 minutes. Since the colored polymer gel did not swell with toluene, the fixing agent did not invade into the interior of the colored polymer gel but was attached on only the surface of the colored polymer gel particles. Thereafter, the colored polymer gel particles were taken out from the fixing agent solution, and the colored polymer gel particles were dried in air strongly blowing at a low temperature (about 5° C.), so that the colored polymer gel particles did not agglomerate. 10 parts by weight of the colored polymer gel particles was then added to 30 parts by weight of the dried light scattering member, followed by mixing in a V-shaped blender. The mixture was then heated at 90° C. for 24 hours to fix the light scattering member on the surface of the colored polymer gel particles by reacting the fixing agent. The colored polymer gel particles having the light scattering member attached on the surface thereof was then cooled and recovered to obtain an optical material comprising the polymer gel particles, the surface of which was covered with the light scattering member. When the optical material was charged into a hydrochloric acid of pH 3, the polymer gel in the light scattering member swelled and covered all over the surface of the colored polymer gel.

The functions of the optical material thus obtained were evaluated as follows.

3.3 parts by weight of the dried optical material was mixed with 1,000 parts by weight of acetone to prepare a dispersion solution of the optical material. The dispersion solution was filtered with suction by using a white filter, and the optical material was uniformly dispersed and adhered on the white filter. The optical density of the white filter before adhesion of the optical material was about 0.15. When an aqueous sodium hydroxide of pH 10 (a liquid absorbed by or released from the polymer gel: water (refractive index: 1.33)) was poured onto the filter having the optical material adhered, the colored polymer gel immediately swelled and the light scattering member immediately contracted to color the optical material, and the optical density measured at a wavelength of 600 nm became about 1.8. When a hydrochloric acid of pH 1 was then poured onto the filter, the colored polymer gel immediately contracted and the light scattering member immediately swelled to discolor (whitely turbid, light scattering state), and the optical density became about 0.16. It was thus confirmed that the optical material colored or discolored by the change in pH and that the optical density was largely changed. When the aqueous sodium hydroxide of pH 10 was again poured onto the white filter, the colored polymer gel swelled and the light scattering member contracted to color again, and the optical density became about 1.8. It was thus confirmed that the optical density was reversibly changed.

During the operation described above, the amount of the light scattering member covering the surface of the colored polymer gel was constant irrespective of the pH. It was therefore considered that the distance among the light scattering members was changed by the volume changes of the colored polymer gel particles and the light scattering member and that the exposed area of the polymer gel particles was largely changed to largely change the light scattering efficiency, so that the optical density was greatly increased or decreased.

It was thus confirmed that the optical material of this example colored or discolored to greatly change the optical density by the volume change thereof and that the change was reversible.

Comparative Examples 1 and 2

Two optical materials were produced in the same manner as in Examples 1 and 2, respectively, except that the surface was not covered with the light scattering member. The optical materials in a dried state were translucent. The functions of the optical members were evaluated in the same manner as in Example 1. The optical density of the black filters before adhering the optical materials were about 1.6. When an aqueous sodium hydroxide of pH 9 was poured on the black filters having the optical materials adhered, the polymer gels swelled to change the optical materials from translucent to transparent, and their optical density became about 1.5. When hydrochloric acid of pH 3 was then poured on the black filters, the polymer gels contracted to change from transparent to translucent, and their optical density became about 1.3. Thus, the optical density was not so changed even when the pH was changed. It was considered that this is because the light scattering efficiency on the surfaces of the contracted optical members is low because the surfaces of the polymer gels was not covered with the light scattering member.

Comparative Example 3

An optical material was produced in the same manner as in Example 3 except that the surface was not covered with the light scattering member. The optical material in a dried state was blue. The optical member was evaluated in the same manner as in Example 3. The optical density of the white filter before adhering the optical material was about 0.15. When an aqueous sodium hydroxide of pH 9 was poured on the filter, the polymer gel swelled, so that the state where blue spots were dispersed on the filter was changed to the state where the whole of the filter was colored blue, and the optical density measured at a wavelength of 600 nm became about 1.0. When a hydrochloric acid of pH 3 was then poured on the filter, the polymer gel contracted, so that the state where the whole of the filter was colored blue was changed to the state where blue spots were dispersed on the filter, and the optical density measured at a wavelength of 600 nm became about 0.60. Thus, when the pH was changed, the change amount of optical density was small, and the blue spots could not be completely eliminated. It was considered that this is because the light scattering efficiency on the surface of the contracting optical member is low because the surface of the colored polymer gel was not covered with the light scattering member.

Comparative Example 4

An optical material was produced in the same manner as in Example 4 except that the surface was not covered with the light scattering member. The optical material in a dried state was blue. The optical member was evaluated in the same manner as in Example 4. The optical density of the white filter before adhering the optical material was about 0.15. When an aqueous sodium hydroxide of pH 9 was poured on the filter having the optical material adhered, the polymer gel swelled, so that the state where black spots were dispersed on the filter was changed to the state where the whole of the filter was colored black, and the optical density measured at a wavelength of 600 nm became about 1.8. When hydrochloric acid of pH 3 was then poured on the filter, the polymer gel contracted, so that the state where the whole of the filter was colored black was changed to the state where black spots were dispersed on the filter, and the optical density measured at a wavelength of 600 nm became about 0.70. Thus, when the pH was changed, the amount of the change in optical density was small, and the black spots could not be completely eliminated. It was considered that this was because the light scattering efficiency on the surface of the contracted optical member was low because the surface of the colored polymer gel was not covered with the light scattering member.

EXAMPLE 5

A composition was prepared by dispersing 0.3 part by weight of the optical material prepared in Example 4 in 90 parts by weight of an aqueous sodium hydroxide ($1.0 \times 10^{-3}$ mol/L). The colored polymer gel containing carbon black absorbed about 300 g of the aqueous sodium hydroxide per 1 g to swell at about the maximum, and the light scattering member contracted, so that the optical material became dark black. A sample was produced by injecting the composition into a cell formed with two glass plates having an ITO electrode sandwiching a spacer having a thickness of 200 μm.

The sample was arranged horizontally on a white filter. The filter had an optical density of about 0.15. When the sample was wired to apply a direct current voltage of 5 V in such a manner that the lower ITO electrode was an anode, the optical material was immediately changed to be substantially white. When the optical density was measured with a measuring device, it was confirmed that the optical density was changed from 0.17 to 1.8. When the application of the voltage was stopped or an opposite voltage was applied to the ITO electrodes, the optical material was changed to be black again, and it was confirmed that the optical density was reversibly changed. After repeating the operation 100 times, the amount of the change in optical density was unchanged and the optical material was stable. Furthermore, it was confirmed that by controlling the application time of the voltage, the optical density could be changed stepwise from 0.17 to 1.8 to form density gradation.

The evaluation results of Examples 1 to 5 and Comparative Examples 1 to 4 are summarized in Table 1 below.

TABLE 1

|  | Optical density when polymer gel contracted | Optical density when polymer gel swelled |
| --- | --- | --- |
| Example 1 | about 0.60 | about 1.5 |
| Example 2 | about 0.60 | about 1.5 |
| Example 3 | about 0.21 | about 1.0 |
| Example 4 | about 0.16 | about 1.8 |
| Example 5 | about 0.17 | about 1.8 |
| Comparative Example 1 | about 1.3 | about 1.5 |
| Comparative Example 2 | about 1.3 | about 1.5 |
| Comparative Example 3 | about 0.60 | about 1.0 |
| Comparative Example 4 | about 0.70 | about 1.8 |

In the optical material and the optical device according to the invention, the light scattering property on the surface of the polymer gel is improved to increase the function of controlling the quantity of light incident on the interior of the polymer gel. Thus, the transparency and the coloring density on swelling is increased, and the light scattering property on contraction is increased. As a result, a high display contrast and a large change in reflectivity can be realized.

What is claimed is:

1. An optical material comprising a polymer gel whose volume is reversibly changed by absorbing or releasing a liquid in response to an external stimulus and a plurality of discrete non-planar light scattering members covering at least part of a surface of said polymer gel.

2. An optical material as claimed in claim 1, wherein said light scattering members comprise a light scattering material having a refractive index different from a refractive index of said liquid.

3. An optical material as claimed in claim 1, wherein said light scattering members comprise a polymer material and a light scattering material dispersed in said polymer material of the light scattering members, said light scattering material having a refractive index different from the refractive index of said liquid.

4. An optical material as claimed in claim 3, wherein said light scattering members comprise a polymer material comprising a second polymer gel that contracts under the condition that said polymer gel of the optical material swells, and swells under the condition that said polymer gel of the optical material contracts.

5. An optical material as claimed in claim 2, wherein said light scattering members comprise particles having an average particle diameter of from about 0.01 μm to about 1 mm.

6. An optical material as claimed in claim 2, wherein the light scattering members comprise particles having an average particle diameter of from about 0.001 μm to about 10 μm.

7. An optical member as claimed in claim 1, wherein said polymer gel comprises particles having an average particle diameter of from about 0.01 μm to about 5 mm when said polymer gel contracts.

8. An optical material as claimed in claim 1, wherein said polymer gel contains a coloring matter.

9. An optical material as claimed in claim 8, wherein an amount of said coloring matter dispersed within the polymer gel is equal to or greater than the amount of coloring matter found in a saturated concentration of the coloring matter in the polymer gel.

10. An optical material as claimed in claim 8, wherein a light absorption efficiency of said coloring matter is greater when said polymer gel swells than when said polymer gel contracts.

11. An optical material as claimed in claim 8, wherein when said coloring matter agglomerates on contraction of said polymer gel, the amount of said coloring matter in said polymer gel is greater than that of a saturated concentration of said coloring matter in said polymer gel.

12. An optical material as claimed in claim 1, wherein said external stimulus is any of change in pH, change in ion concentration, adsorption and desorption of a chemical substance, change in solution composition, heat, light, and a supply of energy by electricity or a magnetic field.

13. An optical material as claimed in claim 1, wherein the volume of said polymer gel on swelling is greater than or equal to 5 times the volume of said polymer gel on contracting.

14. An optical device comprising a cell in which an optical material described in claim 1 and a liquid released from or absorbed by said optical material are kept between a pair of substrates.

15. An optical device as claimed in claim 14, wherein said device further comprises a means for providing an external stimulus to said cell.

16. An optical material as claimed in claim 1, wherein as the volume of the polymer gel reversibly changes by absorbing or releasing said liquid in response to the external stimulus, the light scattering members remain in contact with the surface of said polymer gel.

17. An optical material comprising a polymer gel whose volume is reversibly changed by absorbing or releasing a liquid in response to an external stimulus and a plurality of discrete light scattering members covering at least part of a surface of said polymer gel, wherein the plurality of discrete light scattering members remain in contact with the surface of said polymer gel while said polymer gel reversibly changes in volume.

18. An optical material as claimed in claim 17, wherein said light scattering members comprise a light scattering material having a refractive index different from a refractive index of said liquid.

19. An optical material as claimed in claim 17, wherein said light scattering members comprise a polymer material and a light scattering material dispersed in said polymer material of the light scattering members, said light scattering material having a refractive index different from the refractive index of said liquid.

20. An optical material as claimed in claim 19, wherein said light scattering members comprise a polymer material comprising a second polymer gel that contracts under the condition that said polymer gel of the optical material swells, and swells under the condition that said polymer gel of the optical material contracts.

21. An optical material as claimed in claim 18, wherein said light scattering members comprise particles having an average particle diameter of from about 0.01 μm to about 1 mm.

22. An optical material as claimed in claim 18, wherein the light scattering members comprise particles having an average particle diameter of from about 0.001 μm to about 10 μm.

23. An optical material as claimed in claim 17, wherein said polymer gel comprises particles having an average particle diameter of from about 0.01 μm to about 5 mm when said polymer gel contracts.

24. An optical material as claimed in claim 17, wherein said polymer gel contains coloring matter.

25. An optical material as claimed in claim 24, wherein an amount of said coloring matter dispersed within the polymer gel is equal to or greater than the amount of coloring matter found in a saturated concentration of the coloring matter in the polymer gel.

26. An optical material as claimed in claim 24, wherein a light absorption efficiency of said coloring matter is greater when said polymer gel swells than when said polymer gel contracts.

27. An optical material as claimed in claim 24, wherein when said coloring matter agglomerates on contraction of said polymer gel, the amount of said coloring matter in said polymer gel is greater than that of a saturated concentration of said coloring matter in said polymer gel.

28. An optical material as claimed in claim 17, wherein said external stimulus is any change in pH, change in ion concentration, adsorption and desorption of a chemical substance, change in solution composition, heat, light, and a supply of energy by electricity or a magnetic field.

29. An optical material as claimed in claim 17, wherein the volume of said polymer gel on swelling is greater than or equal to 5 times the volume of said polymer gel on contracting.

30. An optical device comprising a cell in which an optical material described in claim 17 and a liquid released from or absorbed by said optical material are kept between a pair of substrates.

31. An optical device as claimed in claim 30, wherein said device further comprises a means for providing an external stimulus to said cell.

* * * * *